US006947937B1

(12) United States Patent
Winter et al.

(10) Patent No.: US 6,947,937 B1
(45) Date of Patent: Sep. 20, 2005

(54) DATA SELECTION SYSTEM AND METHOD THEREFOR

(75) Inventors: Christopher S Winter, Ipswich (GB); Paul M Coker, London (GB); Richard E Tateson, Wickham Market (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 09/869,150

(22) PCT Filed: Jan. 7, 2000

(86) PCT No.: PCT/GB00/00046

§ 371 (c)(1),
(2), (4) Date: Jun. 25, 2001

(87) PCT Pub. No.: WO00/43908

PCT Pub. Date: Jul. 27, 2000

(30) Foreign Application Priority Data

Jan. 19, 1999 (GB) .................................. 9901138
Apr. 15, 1999 (EP) .................................. 99302928

(51) Int. Cl.[7] ........................................... G06F 17/30
(52) U.S. Cl. ........................... 707/7; 707/1; 707/104.1
(58) Field of Search ................... 707/1–10, 100–104.1; 345/581–588, 418–419, 660–666, 676–681, 345/739, 848–852, 853–855, 30–33, 598–599, 345/715, 798, 799, 977, 978, 727, 719, 722, 345/730, 738, 764, 540

(56) References Cited

U.S. PATENT DOCUMENTS 5,408,654 A * 4/1995 Barry .......................... 707/101
5,666,524 A * 9/1997 Kunkel et al. .................. 707/3
5,768,360 A * 6/1998 Reynolds et al. ....... 379/211.02
6,151,595 A * 11/2000 Pirolli et al. .................... 707/1
6,154,213 A * 11/2000 Rennison et al. ........... 345/854
6,369,819 B1 * 4/2002 Pitkow et al. .............. 345/440
6,385,301 B1 * 5/2002 Nolting et al. ........... 379/32.01
6,509,898 B2 * 1/2003 Chi et al. .................... 345/440
6,546,399 B1 * 4/2003 Reed et al. ............... 707/104.1
6,664,980 B2 * 12/2003 Bryan et al. ................ 345/738

OTHER PUBLICATIONS

Matthias Hemmje, Clemens Kunkel, Alexander Willett; "LyberWorld—A Visualization User Interface Supporting Fulltext Retrieval"; Jul. 3, 1994; GMD Integrated Publication and Information Systems Institute; No. CONF. 17 , pp. 249-259; XP000475325.*

Anselm Spoerri; "InfoCrystal: A visual tool for information retrieval"; Oct. 25, 1993; Institute of Electrical and Electronics Engineers ISBN: 0-8186-3942-3; pp. 150-157; XP 000475422.*

(Continued)

Primary Examiner—Luke S. Wassum
Assistant Examiner—Linh Black
(74) Attorney, Agent, or Firm—Nixon & Vanderhye P.C.

(57) ABSTRACT

A method of sorting large quantities of data is implemented on a computer based system. The method comprises defining a plurality of sort statements, determining the relevance of each of the sort statements to each data file in the database, defining a site on a display for each of the sort statements, representing the data files as elements on the display, and causing the elements to move from an initial position towards the sites according to the relevance of the respective sort parameters to the respective data files and the position of the sites relative to the respective elements.

32 Claims, 4 Drawing Sheets

OTHER PUBLICATIONS

Kai A. Olsen, Robert R. Korfhage, Kenneth M. Sochats, Michael B. Spring, and James G. Williams; "Visualization of a Docume Collection: The VIBE System"; Jan. 1, 1993; ISSN: 0306-4573; vol. 29, No. 1; pp. 69-81; XP 000574984.*

Matthias Hemmje et al., LyberWorld—A Visualization User Interface Supporting Fulltext Retrieval, Mar. 7, 1994, pp. 249-259.*

* cited by examiner

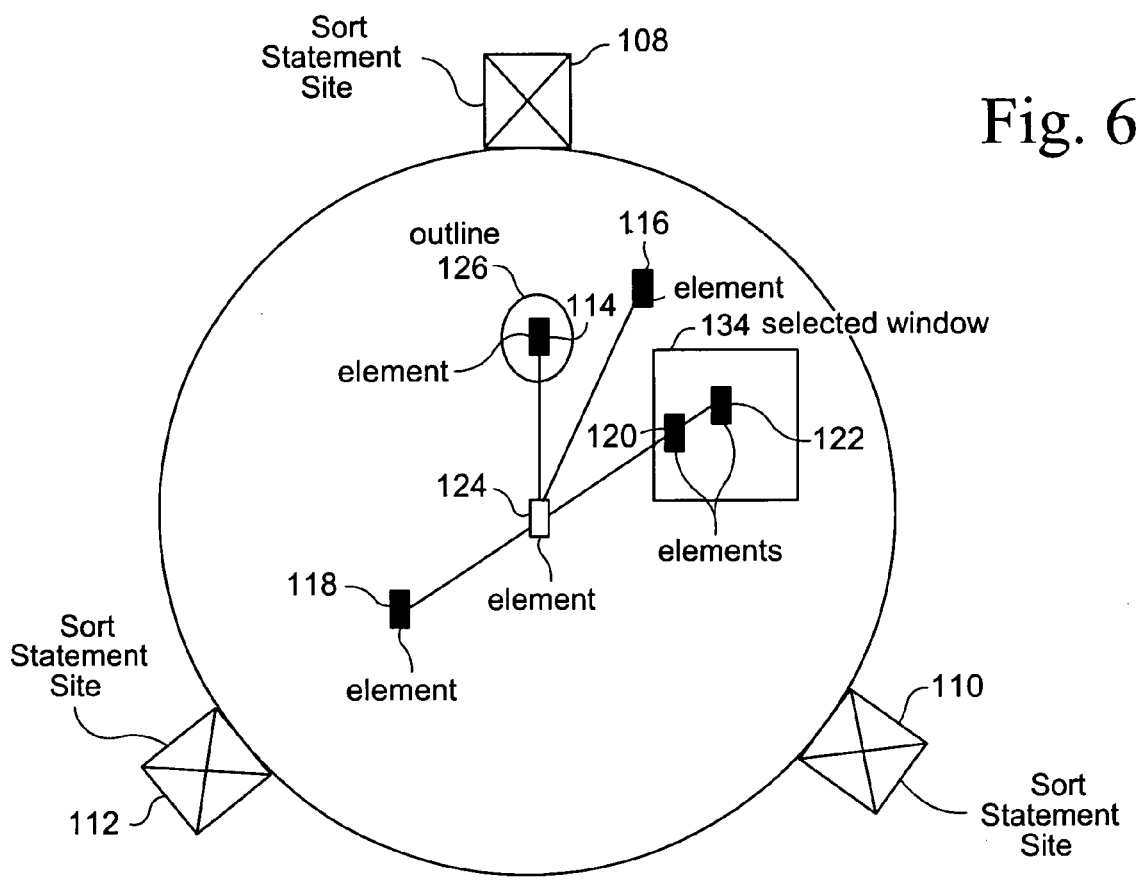
Fig. 6
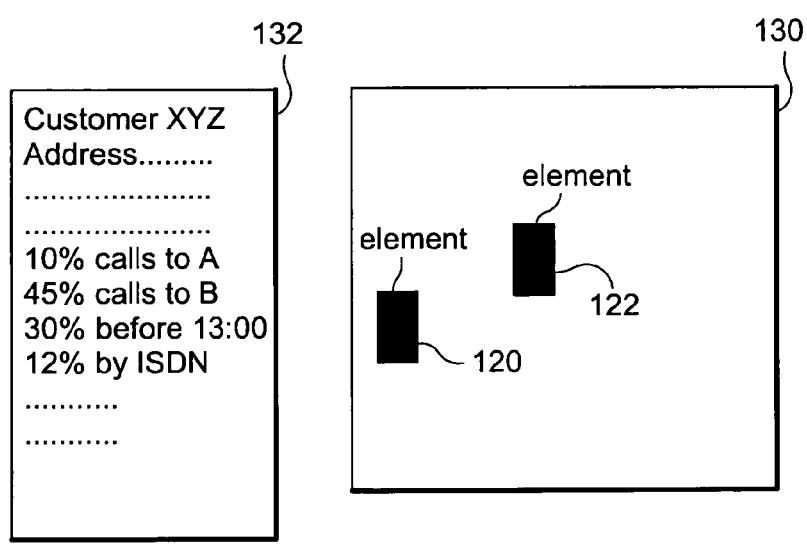

DATA SELECTION SYSTEM AND METHOD THEREFOR

BACKGROUND

1. Field of the Invention

This invention relates to a system and method for accessing data and in particular concerns a system and method for accessing large quantities of data stored in a computer based record system.

2. Description of Related Art

Modern computer based record systems often contain large multi-dimensional databases which contain very large quantities of data. The utility of these systems often depends on the speed and accuracy with which selected data can be accessed in the database. Computer based data access systems capable of searching large databases and retrieving files and records according to one or more user defined parameters are known as are systems capable of searching and analyzing data in such databases to provide statistical information about that data. In these systems data files or records are usually selected for retrieval or analysis on the basis of user defined logic parameters which relate to specific data fields in the data files or records being searched. User defined logic statements are also used to select data files or records in a similar way, that is to say, statements consisting of two or more user defined logic parameters in combination with a logic operand. In this way the data files or records are selected on a binary yes or no basis.

The ability to identify patterns in large quantities of data can be of significant commercial benefit, particularly to a commercial organization that generates a large quantity of customer related data on a regular basis. For example, the call database of a large telecommunications company will contain valuable hidden information regarding groups of customers who have similar usage patterns etc. By identifying customers according to such patterns valuable customer information can be obtained and customer profiles developed.

A problem associated with large computer databases is that it can be extremely difficult to identify hidden patterns in the data using data access systems of the above mentioned type. One reason for this is that a detailed understanding of complex mathematical logic and a knowledge of the database structure is usually required before a user can define the appropriate search parameters and statements to investigate possible patterns in the data. Another reason is that the crude binary selection process prevents the data files or records being selected on a more discriminatory basis, for example according to the extent that the data agrees or disagrees with the search parameter or statement. A further reason is that the selected data can be difficult to interpret when presented to the user, particularly when multiple field data files or records are concerned. There are a limited number of ways in which the selected data files or records can be presented including tables, lists, graphs, charts etc. When multiple field data files or records are presented different comparisons between the various files or records for each of the data fields may be necessary in order for a pattern to be identified in the selected data. Multiple field data files or records also present a similar problem if the selected data is sorted according to a value associated with one or more of the data fields since the data must be presented for comparison for each respective data field into which the data is sorted.

SUMMARY

In the context of the present invention it is to be understood that the term data file relates to any group of data that can be linked together by a common parameter. In the above mentioned call database a data file may comprise all the call data relating to a particular customer, for example.

According to an aspect of the invention there is provided a method of selecting information stored in a data storage system, said method comprising the steps of:— defining at least one sort statement;

determining the value of a relevance parameter for each data file in the stored information in respect of the or each sort statement;

defining at least one sort statement site on a display means, wherein a sort statement site represents a respective sort statement;

representing the data files as elements on the display means;

effecting movement of at least one element from an initial position on the display means towards one or more sort statement sites, the movement of respective elements being determined in accordance with the relevance parameter for their associated data files in respect of each statement so that differences in the data files cause the elements to move relative to one another, thereby to provide a visual indication of the data files being sorted; and selecting at least one data file according to the position on the display means of its respective element.

This allows each of the data files to be represented visually as an element moving on the display means. Patterns in the data are readily recognizable since each element moves in accordance with the relevance of the sort statements to the data file it represents. In this way differences between respective data files can be observed on the display means as relative movements between the respective elements. Thus, hidden patterns in the data are easily identified by observing groups of elements moving in a similar way on the display means. The selecting means allows these groups of elements to be selected so that the respective data files can be accessed and analyzed.

A major advantage of the method of the present invention is that the movement of the elements is determined by the relevance of the respective sort statements to the data files. In this way the data files are represented according to the extent they agree or disagree with the sort statements. This overcomes the problem of selection based on binary sort statements. In this respect the system is suitable for users with only moderate levels of mathematical skill. A further advantage is that a plurality of sort statements can be applied to the data files simultaneously such that the elements move according to the effect of all the sort statements on the respective data files. This allows the user to create logic statements according to the position of the respective sort statements on the display means.

Preferably, said method further comprises the step of accessing data in a selected data file.

In preferred embodiments, the step of determining the value of the relevance parameter for each data file, for each sort statement, is normalized. This is done by identifying the most relevant data file for each sort statement, assigning it a maximum relevance parameter value such as 100% and determining respective normalized values for the rest of the data files based on said maximum relevance parameter value. This enables the respective movements of the elements to be readily determined.

The step of moving the elements may comprise the step of determining a movement vector for each element based on the magnitude of the normalized values of the respective data file and the direction of relevant sort parameter sites relative to the element. In this way the position of the sort statement sites affects the movement of the elements. Accordingly, the sort statement sites can be positioned to investigate any hidden pattern in the data records.

Preferably, the step of determining a movement vector for each element comprises the step of determining a component movement vector for the element in respect of each sort statement based on the magnitude of the respective normalized value of the respective data file for the sort statement and the direction of the respective sort statement site to that element, and summing the component movement vectors.

In preferred embodiments, the elements move in steps and a movement vector is determined for each step. In this way the movement of the elements can be animated on the display means to provide improved visualisation of the data files being sorted. In addition, by recalculating the movement vector for each step the elements follow a more accurate trajectory on the display means which provides for improved identification of patterns in the data files.

Preferably, the display means comprises an array of pixels and respective movement vectors determine which pixels respective elements are to be moved to in each step. This optimises the above mentioned advantages.

Conveniently, the method further comprises the step of applying scaling factors to the respective movement vectors according to the respective positions of the elements on the display means. In this way the velocity of each element is further dependent on its position on the display means.

In preferred embodiments, the step of applying scaling factors comprises the step of selecting a scaling factor area distribution. Accordingly, different scaling factors may be applied to elements at different positions on the display means according to the area distribution selected. In this way an element may be made to speed up or slow down as it moves on the display means.

Preferably, the step of defining the or each sort statement comprises the step of displaying a list of available sort parameters on the display means and selecting a set of sort parameters from the list. In this way the data files can be sorted according to a pre-determined list of sort parameters.

Conveniently, the step of defining the or each sort statement sites comprises the step of selecting a respective position on the display means which corresponds to a point on the circumference of a circle. This enables the movement vectors to be more readily determined.

In preferred embodiments, the initial position of the elements is defined at the centre of the circle. In this respect the elements may be moved from an initial position which is equidistant from all sort parameter sites.

Preferably, each element moves from its initial position towards a site which represents the most relevant sort statement for the respective data file. In this way it is possible to identify patterns in the data by observing the speed and trajectory of the respective elements to their respective site.

Conveniently, the method further comprises the step of storing selected data files. This allows the selected data records to be analyzed further according to further sort statements and parameters.

In preferred embodiments, the method further comprises the step of pre-selecting at least one sub-class of data files to be sorted. This enables the number of data files to be reduced.

Preferably, the method further comprises the step of pre-formatting the data files to be sorted. This provides for a faster method and further optimizes the above mentioned advantages.

According to another aspect of the invention there is provided a system for selecting information stored in a data storage system, said system comprising:—
   a display means;
   a sort statement generator for generating at least one sort statement;
   a position generator for positioning one or more sort statement sites on the display means;
   a data processor for determining the value of a relevance parameter for each data file in the stored information in respect of the or each sort statement;
   a visual signal processor for representing the data files as elements on the display means and for simulating movement of at least one element from an initial position on the display means towards one or more sort statement sites in accordance with the relevance parameter for the associated data file in respect of the or each sort statement so that differences in the data files cause the elements to move relative to one another and provide a visual indication of the data files being sorted; and
   a data selector for selecting at least one data file according to the position on the display means of its respective element.

This enables the above mentioned method to be readily implemented in a data access system.

BRIEF DESCRIPTION OF THE DRAWINGS

The invention will now be described by way of example only, with reference to the accompanying drawings, in which:—

FIG. 6 is a schematic view similar to FIG. 4 showing the elements in a partially sorted position.

DETAILED DESCRIPTION OF EXEMPLARY EMBODIMENTS

Figure 1:
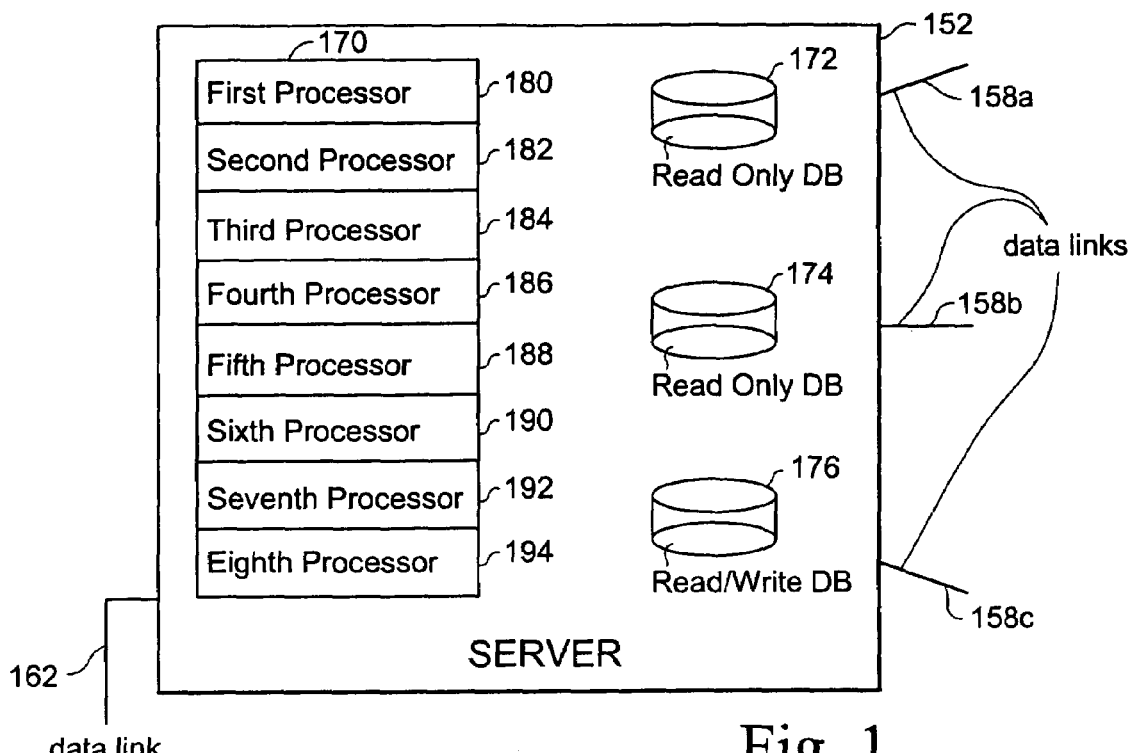
FIG. 1 is a functional block diagram showing part of a client-server arrangement for the system of the present invention.
Figure 2:
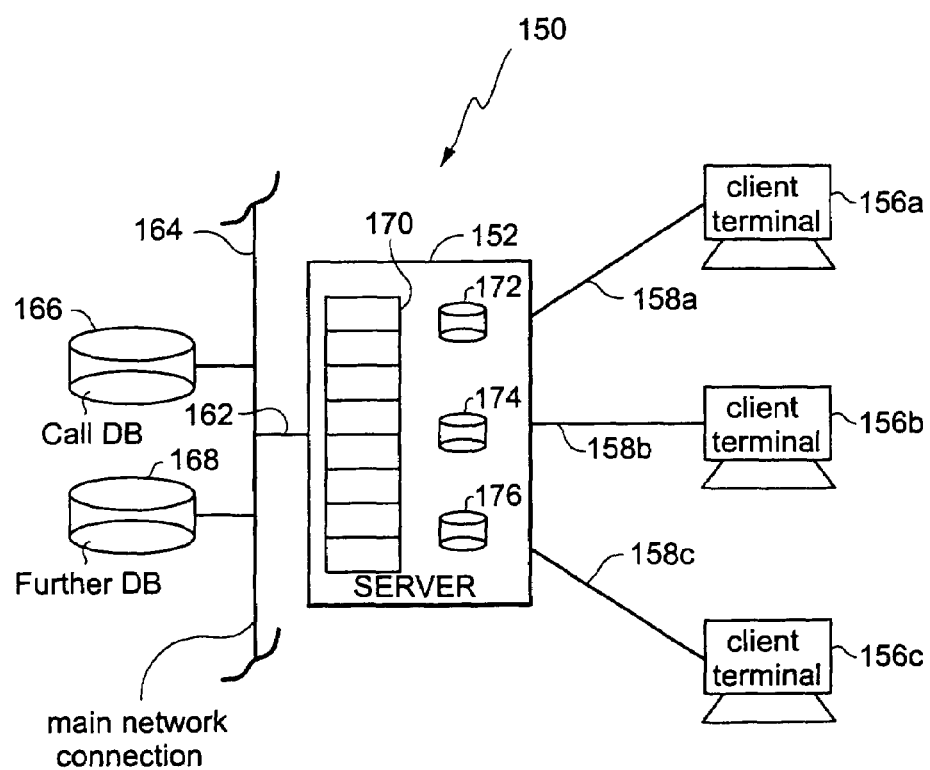
FIG. 2 is a functional block diagram showing a client-server network for implementing the present invention.

With reference to FIGS. 1 and 2, a system embodying the present invention comprises a client-server communication network arrangement 150. A server 152 is connected to a plurality of client terminals 156a–c in the network by means of a plurality of data links 158a–c. The client terminals are conventional computer systems provided with display means in the form of a screen 160. The client terminals are personal computers (PCs) capable of being networked together in a client-server environment. The server 152 has a datalink 162 to a main network connection 164 which is linked to a read only database 166. In this embodiment the database 166 is a call database of a large telecommunications company and contains all the call records of a group of customers for a given accounting period. A further database 168 comprises data from the database 166 which has been restructured by the server 152, or other processor means, into a series of customer related files for use in the method of the present invention.

The server comprises a plurality of processors 170, a read only database 172 storing user interface data, a read only database 174 storing data relating to system operation and user options and a read/write database 176 for storing user defined data.

The data held in database 172 comprises data relating to the user interface used for presenting information to the user on the display means of the client terminals 156*a–c*. This data comprises the definition of the screen layout, data relating to the presentation of user options and data relating to all user interface functions including data identification, selection and access for example. The data held in the database 174 comprises data relating to user selection options including the sort parameters available to be used in data sorting and selection, scaling factors and the like for use in a visual presentation and data filter parameters available to reduce the amount of data prior to sorting, for example. The database 176 stores data that has either been defined by the user such as sort statements comprising one or more of the parameters in database 174, or data that the user has selected for analysis, for example.

The processors 170 comprise a first processor 180 which is capable of reading data from database 166 and restructuring the data into a series of customer files for subsequent use. The restructured data is stored in the database 168 by the processor 180. A second processor 182 provides a data filter. Data from the database 168 is filtered in processor 182 according to user defined filter parameters selected by the user of the system. The user defined filter parameters are stored in the database 176 following user selection and accessed by the processor 182. The filter data is stored in the database 168 by the processor 182. A third processor 184 in the form of a sort statement generator is provided for generating one or more sort statements, that is a sort statement comprising one or more sort parameters selected by the user from the sort parameter options in the database 174. The processor 184 stores the user defined sort statements in the database 176. A fourth processor 186 is provided for determining the value of a relevance parameter for each customer file in respect of each sort statement based on the relevance of the sort parameter to the customer file. In this respect processor 186 is capable of reading the post-filtered customer files from database 168 and storing the relevance values to the database 176. A fifth processor 188 comprises a position generator for establishing a position on the display means to be associated with each sort statement. The fifth processor receives data from the database 174 regarding the options the user may use in defining the positions. These options are available to the user through the user interface. The user also has the option of defining the position manually in which case selection of the positions is controlled by the processor 188. A sixth processor 190 provides a visual signal processor for representing the customer data files as elements on one or more pixels on the display means of the user's client terminals 156*a–c*. The sixth processor is capable of receiving data from the fourth and fifth processors and moving the elements by a number of pixels towards one or more of the sites in order to visually represent the data files being sorted. The visual signal processor 190 has a motion pause function for pausing the motion of the elements on the display means and a zoom function for zooming in on a particular area of the display means. A seventh processor 192 comprises a data selector for user defined selection of customer data files according to the position of the elements on the display means. The data selector allows the user to select one or more records at a time for immediate access of the data or for storage in the database 176 for subsequent access. An eight processor 194 provides a data access processor for accessing the data selected by the user.

Figure 3:
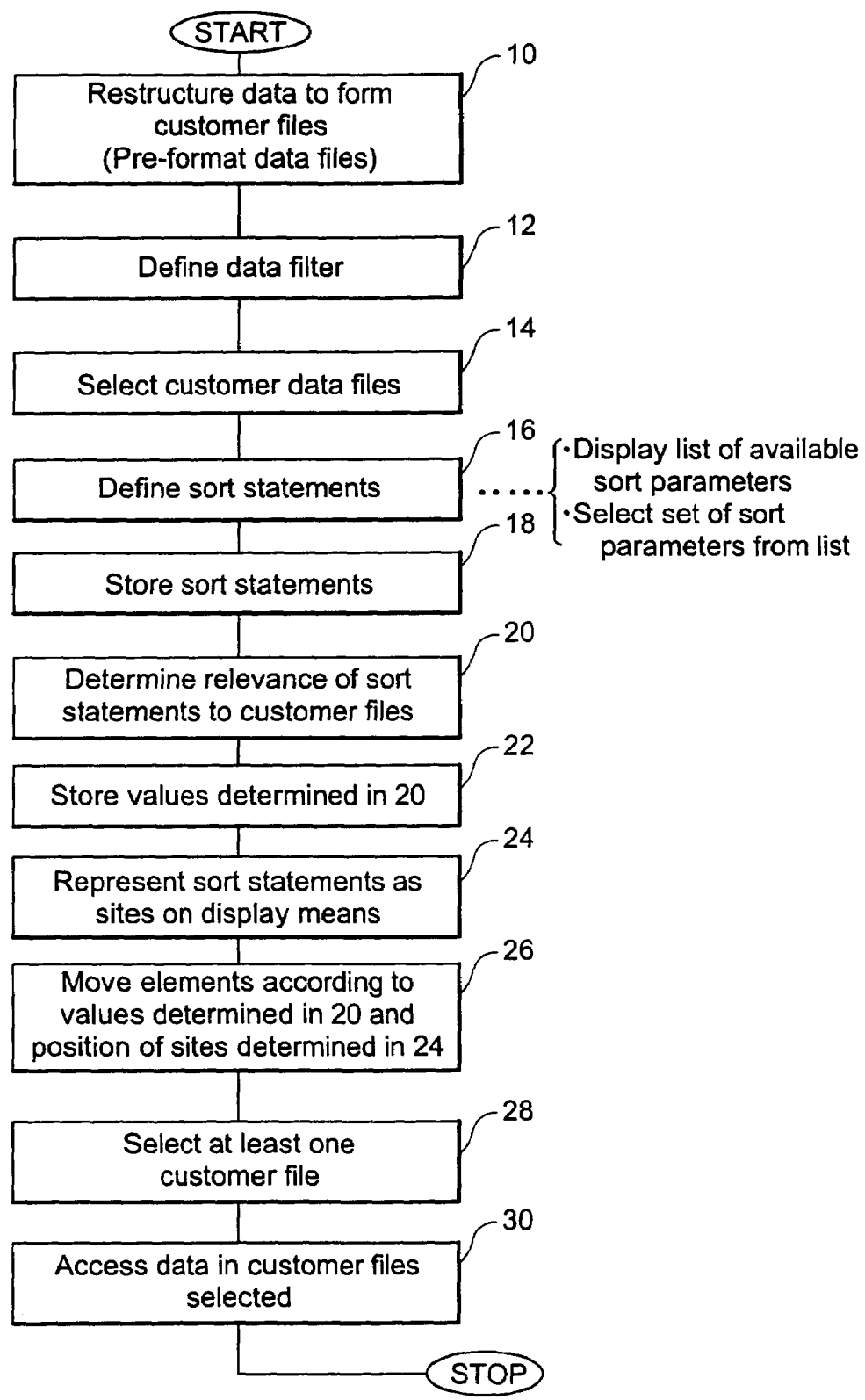
FIG. 3 is a flow chart of a data access method according to an embodiment of the invention.

With reference now to FIG. 3, the flow chart represents a data selection method according to an embodiment of the invention for identifying patterns in data held in a computer database. In one embodiment the method is implemented on the computer based system comprising a client-server network as described above.

In the call database 166 the call records comprise data fields relating to the time, duration, destination, type, cost, etc, of the call together with a field for a unique customer identification code. The customer identification code is provided for cross-referencing to a schedule in the database for identifying the customer making the call. The schedule includes customer details such as name, address, city, county, postal district, ISDN connection?, etc.

In the first step 10 in the flow chart the data held on the call record database is restructured into a series of much smaller customer files. The database is restructured so that each customer file includes static data comprising the customer data previously held in the customer schedule and transaction data comprising the call records for that customer. Step 10 is a pre-processing step for restructuring the data into a more appropriate format for use in the subsequent steps and is carried out independently of the end user. In this regard, step 10 is carried out independently of the steps which define the data access method of the present invention.

Once the data has been restructured, the user is asked to define a data filter for reducing the amount of data to be processed. In step 12 the user is presented with a menu of available options on the display means. The options relate to the fields in the customer schedule of the call database. This step enables sub-classes of customers to be selected. For example, if the user is only interested in accessing data relating to customers in a certain postal district the filter is defined according to the postal district of interest. At this stage the user can select as many sub-classes as desired. Once the filter has been defined the appropriate customer files are selected in step 14.

The user then defines a number of sort statements in step 16 for sorting the customer data into groups based on individual customer call patterns. In this step the user is again presented with a menu of available options on the display means. These options relate to the fields in the customer schedule of the call database and the fields in the call record transaction data. The sort statements are defined according to the options selected by the user. Each sort statement comprises one or more sort parameters which relate to one or more of the data fields. For example, a first sort statement may concern the number of calls a customer has made to a particular destination during certain hours of the day and of a certain duration, a second sort statement may concern the number of calls to a different location in the same time period but of a longer duration, a third statement may concern the total cost of calls in a given period and a fourth statement may concern whether the customer has an ISDN connection. In this respect any number of sort statements can be defined using sort parameters relating to data in both the static and transactional data fields of the customer files. Once the sort statements are defined they are stored at step 18 as a single file.

The relevance of the sort statements to each of the customer files is determined in step 20. In this step, the customer files are read from the memory and compared sequentially with the sort parameters in the processor. The comparison in step 20 depends on the structure of the sort parameter statements, that is to say whether the statements relate solely to the static data, the transactional data or both. If a sort statement relates solely to the static data the comparison is relatively straightforward since the sort parameters are compared on a binary basis with the static data of the file to determine whether the file is relevant or not to that statement. If the sort statement comprises parameters which relate to static data and parameters which relate to transactional data, the relevant static data of the file is first compared with the relevant static data sort parameters before the transaction data of the file is compared with the relevant transaction data sort parameters. That is to say each file is passed through a data filter to determine whether its static data complies with the static data sort parameters prior to comparison with the transactional data. If the static data of a file does not comply, further processing of the file is halted for that sort statement. If there is compliance or the sort statement consists exclusively of sort parameters which relate to the transactional data, the transactional data is compared with the transactional data sort parameters. This comparison involves counting the number of call records which comply with the transactional a data sort parameters in the sort statement.

The above process is repeated for each sort parameter statement for each customer file. Once all the files have been compared the value of a relevance parameter is determined for each data file in respect of each sort statement, that is the files are assigned values representing the relevance of the sort statements to the respective files. If a sort statement comprises only sort parameters which relate to static data the value of the relevance parameter for the sort statement will be either 100% or 0%, that is yes or no. For example, if a sort statement were framed to ask the question "does the customer have an ISDN connection" the outcome would be either yes or no. If on the other hand the sort statement comprises sort parameters which relate to transactional data the value of the relevance parameter for the sort statement will have a value between 0% and 100%. The process of determining the value of the relevance parameter for a sort statement comprising transactional data sort parameters to a customer file involves the step of identifying the most relevant file for that sort statement, that is the file having the most records relevant to that statement, and then determining a normalized percentage value based on the number of records counted for the file and the number of records counted for the most relevant file. For example, if a sort statement is framed to ask the question "total number of calls under 3 minutes" and a file comprising 66 calls is found to be the most relevant a file comprising 33 calls will have a relevance value of 50%. The most relevant file will have a value of 100% indicating that it is very strongly associated with the sort statement. Thus, all the files are given a percentage value corresponding to how strongly associated they are with each of the sort statements defined in step 16. This data is stored for further analysis in step 22. Alternatively, the step of determining the value of the relevance parameter for a sort statement in respect of each file involves the step of determining a value based on the number of transactional records counted for the file and the total number of transactional records in the file. For example, if the sort statement is framed to ask the question "total number of calls under 3 minutes", a file comprising 33 calls of less than 3 minutes out of a total of 100 calls will have a relevance value of 33%.

Figure 4:
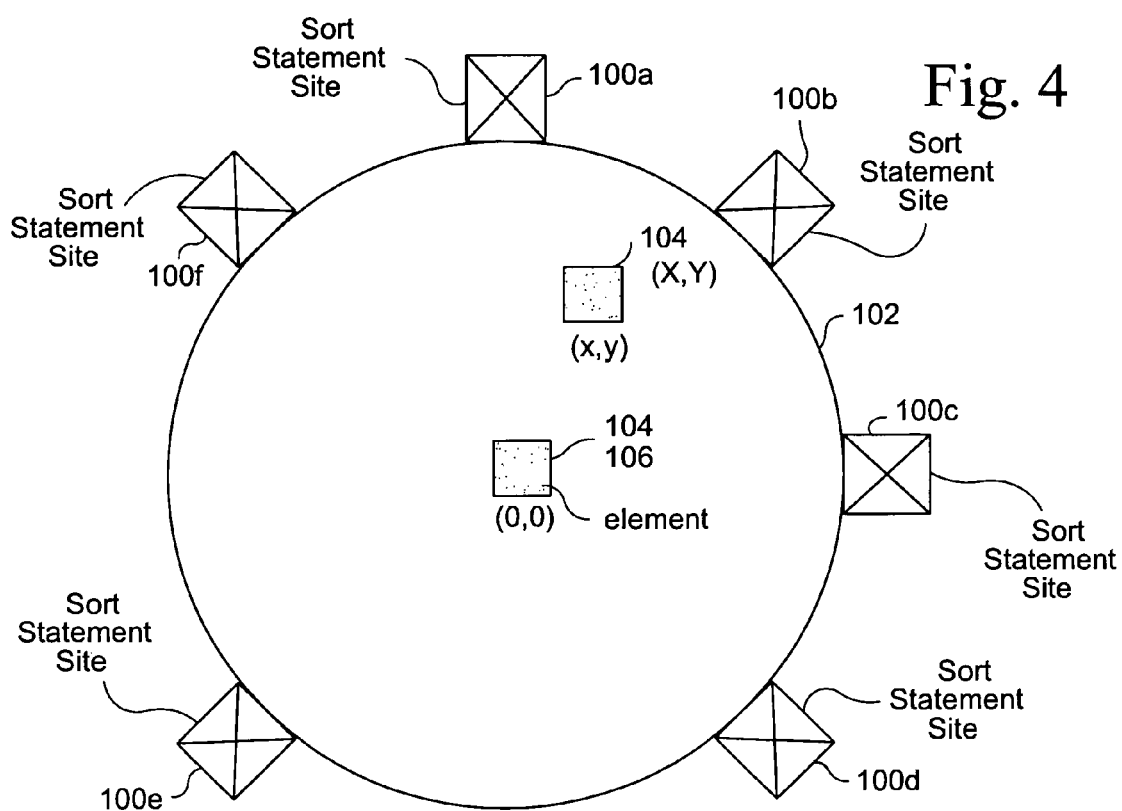
FIG. 4 is a schematic representation of a display means displaying a user interface for use with the present invention.

Patterns in the data are investigated by the user according to the method steps that follow. In step 24 all or selected ones of the sort statements are visually represented on the display means. As shown in FIG. 4, the sort parameters are allocated a respective site 100 (sites 100a–100f) on the display means corresponding to a point on the circumference of a circle 102. The positions of the respective sort statement sites are determined either interactively by the user or automatically by a position generator in the system, but in either case the positions are capable of being moved around the circumference by the user if desired. The sites are distinguished from each other by the use of different colours or shapes etc, which also relate the sites to their respective sort statements by means of a legend displayed on the display means.

At this stage each of the customer files stored in step 22 is represented as an element 104 on the display means at an initial position 106 corresponding to a pixel or group of pixels at the centre of the circle.

Once the user is content with the position of the respective sites, movement of the elements is effected by a user command in step 26. The elements move from the initial position 106 towards the sort parameter sites. Movement of the elements is determined according to the relevance of the selected sort statements to the respective customer files as determined in step 20, and the relative position of the sites to the elements. Differences in the data held on the customer files causes the elements to move relative to one another. In this way the user is presented with a visual indication of the customer files being sorted according to the sort statements defined in step 16.

By way of analogy, the sites can be considered as magnets attracting the elements. The elements are attracted to the sites according to the values determined in step 20 for the respective customer files in relation to the respective sort statements. In this way, an element representing a file that is strongly associated with one of the sort statements will appear to be strongly attracted to the site associated with that statement. Accordingly, an element's movement may be influenced by more than one of the sites such that differences in the data in the customer files cause the elements to move at different speeds and along different trajectories on the display means.

The elements move in steps on the display means according to respective resultant movement vectors determined for each movement step. Each element has a component movement vector associated with each site. The direction of the component movement vector corresponds to the direction of the site in relation to the element. The magnitude of the component movement vector corresponds to the value assigned in step 20 to the customer file represented by the element in relation to the sort statement represented by the site. A maximum movement per step representing a predetermined number of pixels on the display means is associated with each of the sites such that the magnitude of the respective component vectors represent a corresponding number of pixels according to the respective percentage values assigned in step 20. The resultant movement vector of an element is the vector sum of the respective component movement vectors of the element.

The resultant movement vector of an element determines the position on the display means the element is to be moved to in the movement step. In the following steps the directions of the component vectors are determined from the new positions of the elements.

The component movement vector of each element with respect to each site is determined according to the following considerations:— where the co-ordinates of the site are (X,Y);
the co-ordinates of the element are (x,y);
the value assigned to the element for the site in step 20 is A %; and
the maximum movement of the element in one step is movement constant k; then;
movement in x direction=$kA(X-x)/^2\sqrt{((X-x)^2+(Y-y)^2)}$; and
movement in y direction=$kA(Y-y)/^2\sqrt{((X-x)^2+(Y-y)^2)}$;
wherein the net resultant movement vector is the sum of movements due to all the sites.

The elements continue to move until they come to rest either at a point of equilibrium where the component movement vectors balance or at a site the element is most strongly associated with, that is to say the site associated with the most relevant sort statement for the element as determined in 20. In this respect it will be understood that the actual movement of the elements in 26 is of more importance to the user than the final position of the elements. Since all the elements move simultaneously the system and method of the present invention allow the user to identify patterns in the data held on the database by identifying groups of elements which move together on the same or similar trajectories.

The system is further provided with selection means so that the user can interactively select groups of elements in step 28. In addition pause means are provided so that the elements can be selected either while they are moving or when movement is temporarily suspended on the display means by the user. Once an element or group of elements have been selected in step 28 the user is able to access the static and data relating to the transactional data in the customer files represented by the selected elements in step 30.

Figure 5:
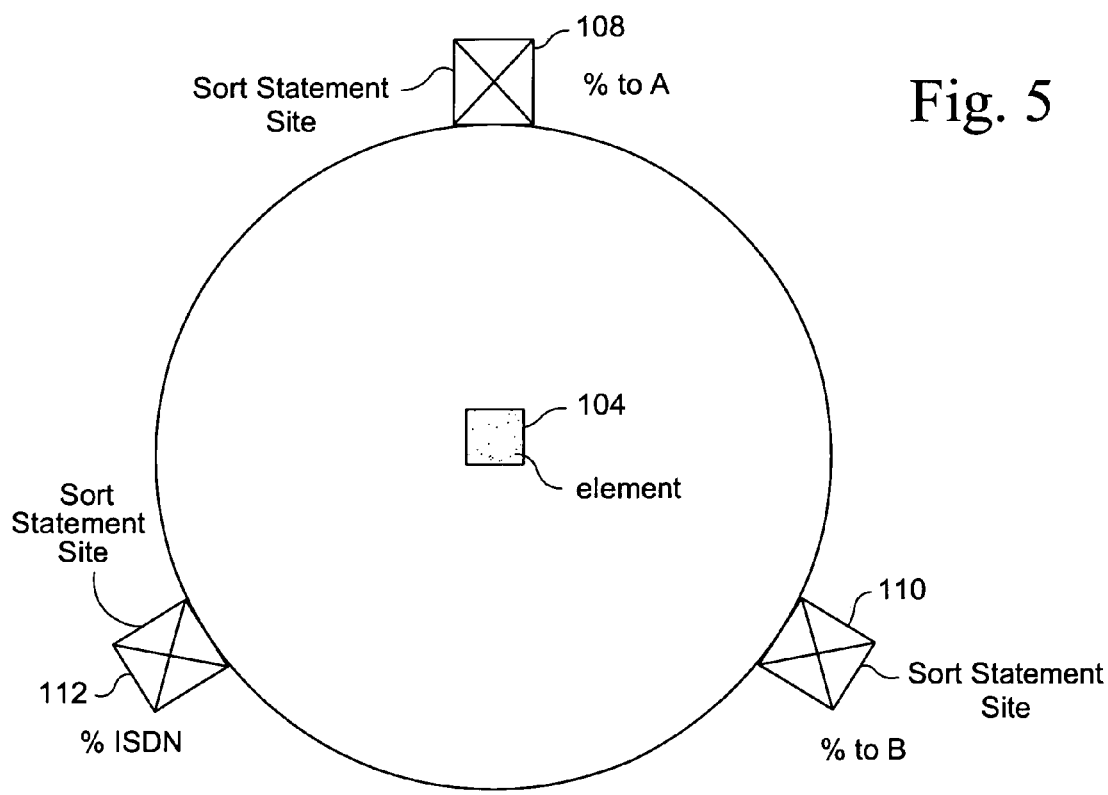
FIG. 5 is a schematic view similar to FIG. 4 showing an initial position of unsorted data elements on the display means.

With reference now to FIGS. 4 and 5, in one example of the method of the present invention one of the sort statements is defined in 16 to ask the question "percentage of calls to destination A". This sort statement is visually represented at site 108 on the perimeter of the circle 102 in step 24. In a similar way a second sort statement is defined to ask the question "percentage of calls to destination B". This statement is visually represented at site 110. Finally, a third statement is defined to ask the question "percentage ISDN calls". This sort statement is visually represented at site 112. In this example the sort statements sites 108, 110 and 112 are equally spaced about the circumference of the circle. As shown in FIG. 5, the elements 104 are initially positioned at the centre of the circle occupying a single pixel or group of pixels prior to movement in step 26.

As can best be seen with reference to FIG. 6, when the elements are moved in step 26 individual elements move relative to one another. The position of the elements in FIG. 6 represents say one hundred movement steps. A first element 114 represents a customer file comprising transaction data comprising 25% of calls to destination A, 0% of calls to destination B and 0% of calls by ISDN. Element 114 thus moves towards the sort statement site at 108 at a rate of 25% of the predetermined maximum number of pixels per step. A second element 116 represents a customer file comprising transaction data comprising 50% of calls to destination A, 25% of calls to destination B and 0% by ISDN. Thus, element 116 is simultaneously attracted to site 108 at a rate of 50% of the maximum number of pixels per step and to site 110 at a rate of 25% of the maximum number of pixels per step. A third element 118 represents a customer file comprising transaction data comprising 5% of calls to destination A, 5% of calls to destination B and 100% of calls by ISDN. Thus, element 118 is simultaneously attracted to site 108 by 5%, to site 110 by 5% and to site 112 by 100%. A fourth element 120 represents a customer file comprising transaction data comprising 40% calls to destination A, 40% of calls to destination B and 0% calls by ISDN. Element 120 is thus attracted to sites 108 and 110 by equal amounts and moves on a trajectory which represents a locus equidistant from sites 108 and 110. When the visualisation is complete element 120 will come to rest in a position indicated at 122 in FIG. 6 which is mid way between the sites 108 and 110. Finally, a fifth element 124 represents a customer file comprising transaction data comprising 50% of calls to destination A, 50% of calls to destination B, and 50% of calls by ISDN. Element 124 is equally attracted to all three sites and since the sites are equally spaced, the resultant net movement vector is zero and therefore the element remains at the centre of the circle.

In FIG. 6 it will be appreciated that those groups of elements moving along similar trajectories at similar speeds represent customer files having similar characteristics as far as the sort statements represented by the sites 108, 110 and 112 are concerned. In this way patterns in the data can be identified by the user selecting groups of similarly moving elements. In FIG. 6, the user might select the group of elements in the region of element 114 by defining an outline 126 around the group of elements of interest. In the present embodiment the user moves a cursor over the display means to draw an outline around the elements. The elements are selected by the user effecting a selection command once the outline is defined. Additionally or alternatively individual elements may be selected by the user identifying an element of interest by moving a cursor to the position occupied by the element on the display means and effecting a selection command. In order to assist the user in selecting elements the system further comprises a zoom function which allows a selected window 134 on the display means to be enlarged for visual enhancement and displayed on the display means as shown at 130. The window 134 is defined by the user moving a cursor over the display means and indicating the area of interest by selecting opposing corners of a rectangular area to be enlarged.

Data in the selected data files is accessed either by being displayed on the display means at the time of selection in region 132, or is just identified and then stored for further sorting using a different set of sort statements or using the same sort statements but using different relative positions on the circle for the respective sites.

The system of the present invention allows the sites to be re-positioned and sort statements added or de-selected by the user even when the data is being processed and the elements are being moved in step 26. In this way, the user is able to control the visual sorting of the records if no discernible patterns emerge in the data at an early stage in the visual sorting process.

In a further embodiment of the present invention, the user is presented with a choice of scaling factors to be applied to the movement vectors for each movement step. In one example the scaling factors relate the strength of attraction of a site to the distance of the respective elements from the site so that the elements appear to speed up as they approach the site. This type of scaling is analogous to the attraction of a magnet. Expressed another way the scaling factors define landscapes over the region of the display means, that is to say the scaling factors act as either positive or negative gradients with respect to the elements. In this way the speed of an element is affected by its position on the display means such that a positive gradient will cause the element to move slower and a negative gradient will cause the element to move faster. An example includes a landscape of scaling factors based on concentric contour lines positioned about the centre of the circle 102 which represent either a valley or hill type distribution for slowing down or speeding up the motion of the elements. The system preferably comprises a plurality of pre-defined scaling factor maps of the above sort for selection by the user.

It will be appreciated that the method and system of the present invention allows data to be sorted and accessed in a manner which readily allows patterns to be identified, particularly in large quantities of data such as the call database described. The ability to position and reposition the sort statement sites allows complex analytical questions to be framed. By selectively positioning the sort statement sites relative to one another data can be sorted according to logic AND, OR or Exclusive OR (XOR) combinations of the sort statements. For example, an element which moves rapidly to a site will occupy a position representing a logic XOR indicating that the data file is more strongly associated with that site; an element which is positioned between two sites will occupy a position representing a logic AND since the data file is equally attracted to both sites; and an element which remains substantially at the centre of the circle will be equally or NOT attracted to all the sites.

It will be appreciated that the present invention is not limited to the above mentioned embodiments but also includes variations to these embodiments which would be readily apparent to the skilled addressee. For example, the invention is not limited to accessing data in a call database. Indeed the invention is suitable for identifying patterns in any collection of data regardless of type or form. Moreover, it will be understood that the order of the method steps concerning the step of defining the sort parameter sites and the step of determining the relevance of the sort parameters to the customer data files can be interchanged without departing from the scope of the invention. Similarly, the step of displaying the elements can be interchanged with these steps without departing from the scope of the present invention.

What is claimed is:

1. A method of sorting information stored in a data storage system, said information being stored as a plurality of data files, said method comprising the steps of:
   defining at least one sort statement;
   determining the value of a relevance parameter for each of the plurality of data files in the stored information in respect of the or each sort statement;
   defining at least one sort statement site on a display, wherein a sort statement site represents a respective sort statement;
   representing the data files as elements on the display; and
   effecting movement of at least one element from an initial position on the display towards one or more sort statement sites, the speed and direction of movement of respective elements being determined in accordance with the relevance parameter for their associated data files in respect of each statement so that differences in the data files cause the elements to move relative to one another, thereby to provide a visual indication of the data files being sorted on the display.

2. A method according to claim 1 further comprising the step of accessing data in the selected data file.

3. A method according to claim 1 wherein the step of determining the value of the relevance parameter for each data file, for each sort statement, comprises the step of identifying the most relevant data file for each sort statement, assigning it a maximum relevance parameter value and determining respective normalized values for the rest of the data files based on said maximum relevance parameter value.

4. A method according to claim 3 wherein the step of moving the elements comprises the step of determining a movement vector for each element based on the magnitude of the normalized values of the respective data file and the direction of relevant sort statement sites relative to the element.

5. A method according to claim 4 wherein the step of determining a movement vector for each element comprises the step of determining a component movement vector for the element in respect of each sort statement based on the magnitude of the respective normalized value of the respective data file for the sort statement and the direction of the respective sort statement site to that element, and summing the component movement vectors.

6. A method according to claim 4 wherein the elements move in steps and a movement vector is determined for each step.

7. A method according to claim 6 wherein the display comprises an array of pixels, and the movement vectors determine to which pixels the respective elements are moved in each step.

8. A method according to claim 4 further comprising the step of applying scaling factors to the respective movement vectors according to the respective positions of the elements on the display.

9. A method according to claim 8 wherein the step of applying scaling factors comprises the step of selecting a scaling factor area distribution.

10. A method according to claim 1 wherein the step of defining the or each sort statement comprises the step of displaying a list of available sort parameters on the display and selecting a set of sort parameters from the list.

11. A method according to claim 1 wherein the step of defining the or each sort statement site comprises the step of selecting a respective position on the display which correspond to a point on the circumference of a circle.

12. A method according to claim 11 wherein the initial position of the elements is defined at the center of the circle.

13. A method according to claim 1 wherein each element moves from its initial position towards a site which represents the most relevant sort statement for the respective data file.

14. A method according to claim 1 further comprising the step of storing the selected data files.

15. A method according to claim 1 further comprising the step of pre-selecting at least one sub-class of data files to be sorted.

16. A method according to claim 1 further comprising the step restructuring a database into a series of individual data files.

17. A system for sorting information stored in a data storage system, said system comprising:
   a display means;
   a sort statement generator for generating at least one sort statement;
   a position generator for positioning respective sort statement sites on the display means;

a data processor for determining the value of a relevance parameter for each of a plurality of data files in the stored information in respect of the or each sort statement; and a visual signal processor for representing the data files as elements on the display means and for simulating movement, including speed and direction of the movement, of at least one element from an initial position on the display means towards one or more sort statements in accordance with the relevance parameter for the associated data file in respect of each statement so that differences in the data files cause the elements to move relative to one another and provide a visual indication of the data files being sorted on the display means.

18. A method according to claim 1, wherein the information stored as a plurality of data files and being sorted is information related to calls.

19. A method according to claim 18, wherein sort statements relate to at least one of the following: number of calls to a certain destination, duration of calls, and cost of calls.

20. A system according to claim 17 wherein the data processor determines the value of the relevance parameter for each data file, for each sort statement, by identifying the most relevant data file for each sort statement, assigning it a maximum relevance parameter value and determining respective normalized values for the rest of the data files based on said maximum relevance parameter value.

21. A system according to claim 20 wherein moving the elements comprises determining a movement vector for each element based on the magnitude of the normalized values of the respective data file and the direction of relevant sort statement sites relative to the element.

22. A system according to claim 21 wherein determining a movement vector for each element comprises determining a component movement vector for the element in respect of each sort statement based on the magnitude of the respective normalized value of the respective data file for the sort statement and the direction of the respective sort statement site to that element, and summing the component movement vectors.

23. A system according to claim 21 wherein the elements move in steps and a movement vector is determined for each step.

24. A system according to claim 23 wherein the display means comprises an array of pixels, and the movement vectors determine to which pixels the respective elements are moved in each step.

25. A system according to claim 21 wherein scaling factors are applied to the respective movement vectors according to the respective positions of the elements on the display means.

26. A system according to claim 25 wherein applying scaling factors comprises selecting a scaling factor area distribution.

27. A system according to claim 17 wherein defining the or each sort statement comprises displaying a list of available sort parameters on the display means and selecting a set of sort parameters from the list.

28. A system according to claim 17 wherein defining the or each sort statement site comprises selecting a respective position on the display means which correspond to a point on the circumference of a circle.

29. A system according to claim 28 wherein the initial position of the elements is defined at the center of the circle.

30. A system according to claim 17 wherein each element moves from its initial position towards a site which represents the most relevant sort statement for the respective data file.

31. A system according to claim 17 wherein the information stored as a plurality of data files and being sorted is information related to calls.

32. A system according to claim 31 wherein sort statements relate to at least one of the following: number of calls to a certain destination, duration of calls, and cost of calls.

* * * * *